(12) United States Patent
Kawaguchi et al.

(10) Patent No.: US 9,886,107 B2
(45) Date of Patent: Feb. 6, 2018

(54) INFORMATION PROCESSING APPARATUS, INFORMATION PROCESSING METHOD, AND PROGRAM

(71) Applicant: Sony Corporation, Tokyo (JP)

(72) Inventors: Hiroto Kawaguchi, Kanagawa (JP); Manabu Kodate, Kanagawa (JP); Munetake Ebihara, Tokyo (JP)

(73) Assignee: Sony Corporation, Tokyo (JP)

( * ) Notice: Subject to any disclaimer, the term of this patent is extended or adjusted under 35 U.S.C. 154(b) by 100 days.

(21) Appl. No.: 14/888,475

(22) PCT Filed: Feb. 12, 2014

(86) PCT No.: PCT/JP2014/000715
§ 371 (c)(1),
(2) Date: Nov. 2, 2015

(87) PCT Pub. No.: WO2014/188635
PCT Pub. Date: Nov. 27, 2014

(65) Prior Publication Data
US 2016/0188014 A1    Jun. 30, 2016

(30) Foreign Application Priority Data
May 20, 2013   (JP) .................................. 2013-105763

(51) Int. Cl.
G06F 3/0354    (2013.01)
G06F 3/041     (2006.01)
G06F 3/044     (2006.01)
G06F 3/038     (2013.01)

(52) U.S. Cl.
CPC .......... *G06F 3/03545* (2013.01); *G06F 3/038* (2013.01); *G06F 3/044* (2013.01); *G06F 3/0414* (2013.01); *G06F 3/0416* (2013.01); *G06F 2203/04104* (2013.01)

(58) Field of Classification Search
None
See application file for complete search history.

(56) References Cited

FOREIGN PATENT DOCUMENTS

| JP | 2000-194618 | A2 | 7/2000 |
|----|-------------|----|--------|
| JP | 2000-222527 | A  | 8/2000 |
| JP | 2004-062251 | A  | 2/2004 |
| JP | 2004-170736 | A  | 6/2004 |
| JP | 2012-043029 | A  | 3/2012 |
| JP | 2012-168993 | A  | 9/2012 |

*Primary Examiner* — Nicholas Lee
(74) *Attorney, Agent, or Firm* — Wolf, Greenfield & Sacks, P.C.

(57) ABSTRACT

An information processing apparatus includes a sensor, a storage section, and a controller. The sensor includes an input surface for accepting an input operation of a user using a writing tool and is capable of detecting coordinates of a position at which the input operation is made and a weight applied to the position. The controller is capable of causing the storage section to store, at predetermined time intervals, coordinate data indicating the detected coordinates and weight data indicating the weight in association with identification information of the user, and reading out the stored coordinate data and weight data from the storage section in association with the identification information.

19 Claims, 9 Drawing Sheets

INFORMATION PROCESSING APPARATUS, INFORMATION PROCESSING METHOD, AND PROGRAM

TECHNICAL FIELD

The present technique relates to an information processing apparatus including a touch sensor, and an information processing method and a program for the information processing apparatus.

BACKGROUND ART

From the past, information processing apparatuses with each of which a user is capable of performing an input operation on a screen using a writing tool such as a stylus (hereinafter, referred to as pen input) via a touch panel or a touch pad are put to practical use (see, for example, Patent Document 1). The pen input is realized by detecting a position of a pen and displaying an image on a display apparatus based on detection data.

Patent Document 1: Japanese Patent Application Laid-open No. 2012-168993

SUMMARY OF INVENTION

Problem to be Solved by the Invention

The pen input technique of the related art as described above is specialized in displaying input results of letters and line arts in real time. However, if the information processing apparatus can stably and accurately detect not only a position of the pen on the screen but also a pressing force of the pen, it becomes possible to record more specific features at a time of a pen input of each user, such as a writing pressure and a brushwork, in addition to a handwriting. The feature data can then be used in various applications.

In view of the circumstances as described above, the present technique aims at providing an information processing apparatus capable of recording, for each user, specific features at a time of an input using a writing tool and utilizing them, and an information processing method and a program for the information processing apparatus.

Means for Solving the Problem

To attain the object described above, according to an embodiment of the present technique, there is provided an information processing apparatus including a sensor, a storage section, and a controller. The sensor includes an input surface for accepting an input operation of a user using a writing tool and is capable of detecting coordinates of a position at which the input operation is made and a weight applied to the position. The controller is capable of causing the storage section to store, at predetermined time intervals, coordinate data indicating the detected coordinates and weight data indicating the weight in association with identification information of the user, and reading out the stored coordinate data and weight data from the storage section in association with the identification information.

With this structure, since the information processing apparatus can detect not only the coordinate data at the time an input operation is made to the sensor using the writing tool but also the weight data, specific features obtained at the time the input operation is made using the writing tool can be recorded for each user and utilized. Here, examples of the writing tool include various tools with which a writing operation can be made irrespective of the shape or the use of inks, such as a stylus, a pen, and an ink brush.

The controller may be capable of calculating movement velocity data indicating a movement velocity of the coordinates from the coordinate data stored at the predetermined time intervals.

Accordingly, by also calculating the movement velocity data in addition to the coordinate data and the weight data, the information processing apparatus can more specifically record the features at the time the input operation is made and utilize them.

The controller may be capable of calculating weight change data indicating a temporal change of the weight from the weight data stored at the predetermined time intervals.

Accordingly, by also calculating the weight change data in addition to the coordinate data and the weight data, the information processing apparatus can more specifically record the features at the time the input operation is made and utilize them.

The controller may be capable of comparing the coordinates and the weight detected from an input operation made using the writing tool after the coordinate data and the weight data are stored, with the stored coordinate data and weight data and judging whether there is a difference.

Accordingly, the information processing apparatus can judge a difference in the features of input operations made by different users based on the coordinate data and the weight data.

The controller may be capable of authenticating the user based on the judgment on whether there is a difference and outputting an authentication result.

Accordingly, the information processing apparatus can perform individual authentications based on the difference in the coordinate data and the weight data.

The information processing apparatus may further include a display section. In this case, the controller may be capable of controlling the display section to display, based on the input operation, an image showing a trajectory from a start to an end of the input operation using only the coordinate data out of the coordinate data and the weight data.

Accordingly, while both the coordinate data and the weight data are used in the authentication processing in the information processing apparatus, by not reflecting the weight data onto an image as a result of the input operation of the user, it can be made difficult for a copier to copy input operations of other users including weights.

The information processing apparatus may further include an output section. In this case, the controller may be capable of controlling the output section to output information indicating the judged difference.

Accordingly, the information processing apparatus can notify the user of a difference in the operation inputs based on the difference in the coordinate data and the weight data.

The information processing apparatus may further include a display section. In this case, the controller may be capable of controlling the display section to display, based on the stored coordinate data and weight data, a first image that shows a trajectory from a start to an end of the input operation of the user.

Accordingly, other users that have performed operation inputs after the coordinate data and the weight data are stored can reference the trajectory of the operation input of the user for which the coordinate data and the weight data are stored as their own examples, for example.

The sensor may be capable of detecting, after the display of the image, coordinate data and weight data from an input operation made by another user using the writing tool. In this case, the controller may be capable of controlling the display section to display, based on the detected coordinate data and weight data, a second image that shows a trajectory from a start to an end of the input operation of the another user while superimposing the second image on the first image. The controller may also be capable of comparing the stored coordinate data and weight data with the coordinate data and the weight data detected from the input operation of the another user, and controlling the display section to display information indicating a difference between the first image and the second image.

Accordingly, by displaying the first image based on the stored coordinate data and weight data and notifying the user of the difference between the first image and the second image drawn by another user, the information processing apparatus can assist technical improvements in pen writing, calligraphy, painting, and the like.

The controller may change a line width or shading of the first image and the second image according to the stored weight data and the weight data detected from the input operation of the another user.

Accordingly, the information processing apparatus can express specific features such as a writing pressure of each user by the line width or shading in the first image and the second image to more specifically notify the difference between the images.

The sensor may be capable of detecting, when a hand of the user touches the input surface at a time the user makes the input operation using the writing tool, coordinates of the contact position and a weight applied to the contact position. In this case, the controller may cause the storage section to store coordinate data indicating the detected coordinates of the contact position and weight data indicating the weight applied to the contact position in association with the coordinate data and the weight data, that have been detected from the input operation, and the identification information.

Accordingly, by recording not only the features of the user in the input operation of the user using the writing tool but also a feature related to how a hand of the user is placed during the input operation, the information processing apparatus can more specifically record the features of the user.

The information processing apparatus may further include a communication section. In this case, the controller may control the communication section to transmit the stored coordinate data and weight data to another information processing apparatus. The another information processing apparatus may display an image that shows a trajectory from a start to an end of the input operation of the user based on the transmitted coordinate data and weight data.

Accordingly, the information processing apparatus can reproduce the input operation of the user using the writing tool in other information processing apparatuses.

According to another embodiment of the present technique, there is provided an information processing method including: detecting, by a sensor including an input surface for accepting an input operation of a user using a writing tool, coordinates of a position at which the input operation is made and a weight applied to the position; storing, by a storage section, at predetermined time intervals, coordinate data indicating the detected coordinates and weight data indicating the weight in association with identification information of the user; and reading out the stored coordinate data and weight data from the storage section in association with the identification information.

According to another embodiment of the present technique, there is provided a program that causes an information processing apparatus to execute a detection step, a storage step, and a reading step. The detection step includes detecting, by a sensor including an input surface for accepting an input operation of a user using a writing tool, coordinates of a position at which the input operation is made and a weight applied to the position. The storage step includes storing, by a storage section, at predetermined time intervals, coordinate data indicating the detected coordinates and weight data indicating the weight in association with identification information of the user. The reading step includes reading out the stored coordinate data and weight data from the storage section in association with the identification information.

Effect of the Invention

As described above, according to the present technique, specific features obtained at a time an input is made using a writing tool can be recorded for each user and utilized.

MODES FOR CARRYING OUT THE INVENTION

Hereinafter, embodiments of the present technique will be described with reference to the drawings.

First Embodiment

First, a first embodiment of the present technique will be described. In this embodiment, the present technique is applied to a tablet computer. The tablet computer is used in a system that requires an authentication by a signature for settlements in shops and websites, various procedures in banks, and the like, for example. The tablet computer may be possessed by a user or by a shop or the like.

[Structure of Tablet Computer]

Figure 1:
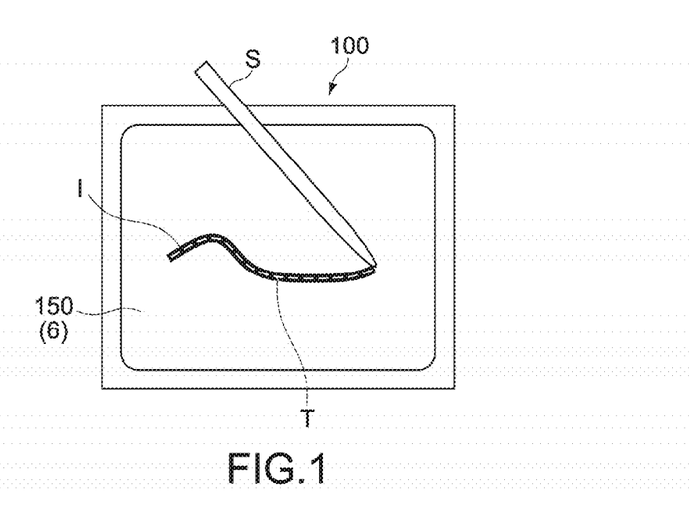
FIG. 1 A diagram showing an outer appearance of a tablet computer according to a first embodiment of the present technique.
Figure 2:
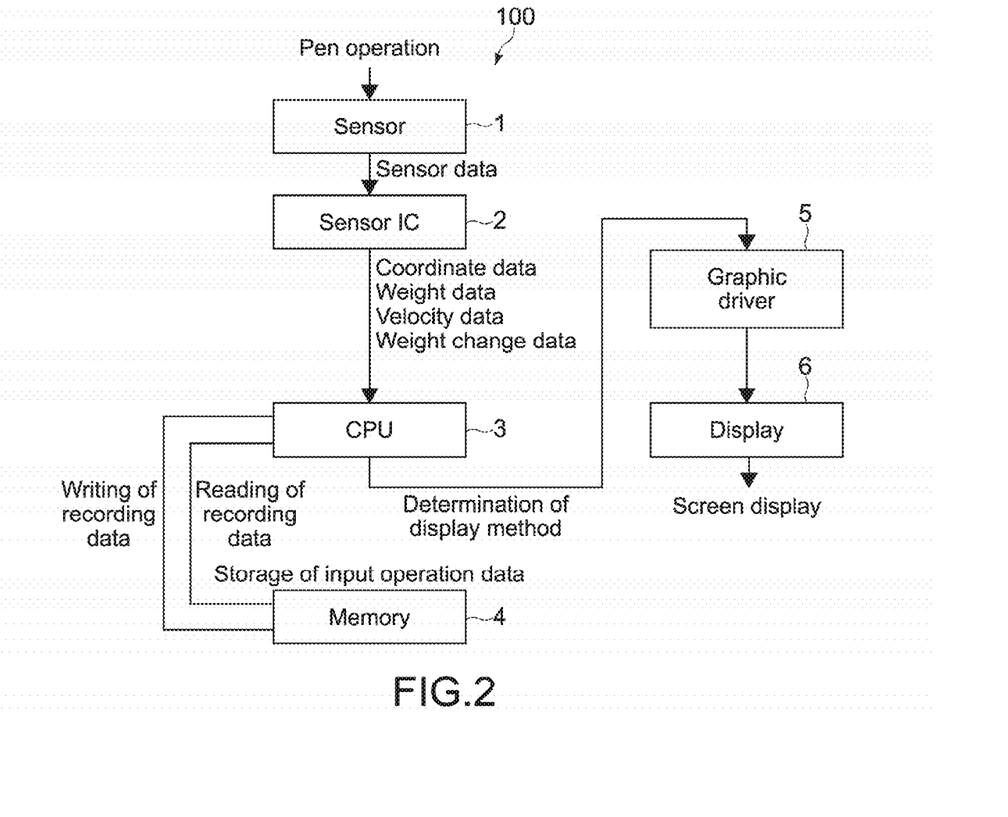
FIG. 2 A block diagram showing a structure of the tablet computer.

FIG. 1 is a diagram showing an outer appearance of a tablet computer 100 (hereinafter, simply referred to as tablet 100) of this embodiment. FIG. 2 is a block diagram showing a structure of the tablet 100.

As shown in FIG. 1, the tablet 100 includes an input apparatus 150 that accepts an input operation made using a writing tool such as a stylus S (hereinafter, also referred to as pen operation).

The input apparatus 150 has a structure in which a sensor 1 to be described later and a display 6 that displays letters and images based on pen operations are integrated. When a pen operation is made on an input screen of the display 6, an image I is displayed on the display 6 along a trajectory T of a tip end position of the stylus S.

As shown in FIG. 2, the tablet 100 includes the sensor 1, a sensor IC 2, a CPU (Central Processing Unit) 3, a memory 4, a graphic driver 5, and the display 6. As described above, the input apparatus 150 is constituted of the sensor 1 and the display 6. The specific structure of the input apparatus 150 will be described later.

The sensor IC 2 receives sensor data detected by the sensor 1 at predetermined time intervals and calculates coordinate data and weight data of the stylus S based on the sensor data. The sensor IC also calculates data indicating a movement velocity of the coordinates of the stylus S from the coordinate data obtained at the predetermined time intervals and calculates data indicating a temporal weight change (hereinafter, also referred to as weight change data) from the weight data obtained at the predetermined time intervals. The calculated pieces of data are output to the CPU 3.

The CPU 3 writes the sensing data output from the sensor IC 2 in the memory 4 and reads out the written data from the memory 4 as appropriate. At this time, the data is recorded in association with a user that has made the pen operation. Then, the CPU 3 determines a data display method for the display 6 based on the sensing data output from the sensor IC 2 or read out from the memory 4 and instructs the graphic driver 5 to display.

The memory 4 stores the sensing data as input operation data of each user. The memory 4 also stores other data such as programs requisite for accepting a pen operation, reproducing pen operation data, and the like.

The graphic driver 5 generates an image corresponding to a pen operation (image showing trajectory of stylus S, etc.) based on the display instruction from the CPU 3 and outputs it to the display 6 for display.

Although not shown, the tablet 100 may also include a communication section for communicating with other information processing apparatuses in a wireless or wired manner.

[Structure of Input Apparatus]

Figure 3:
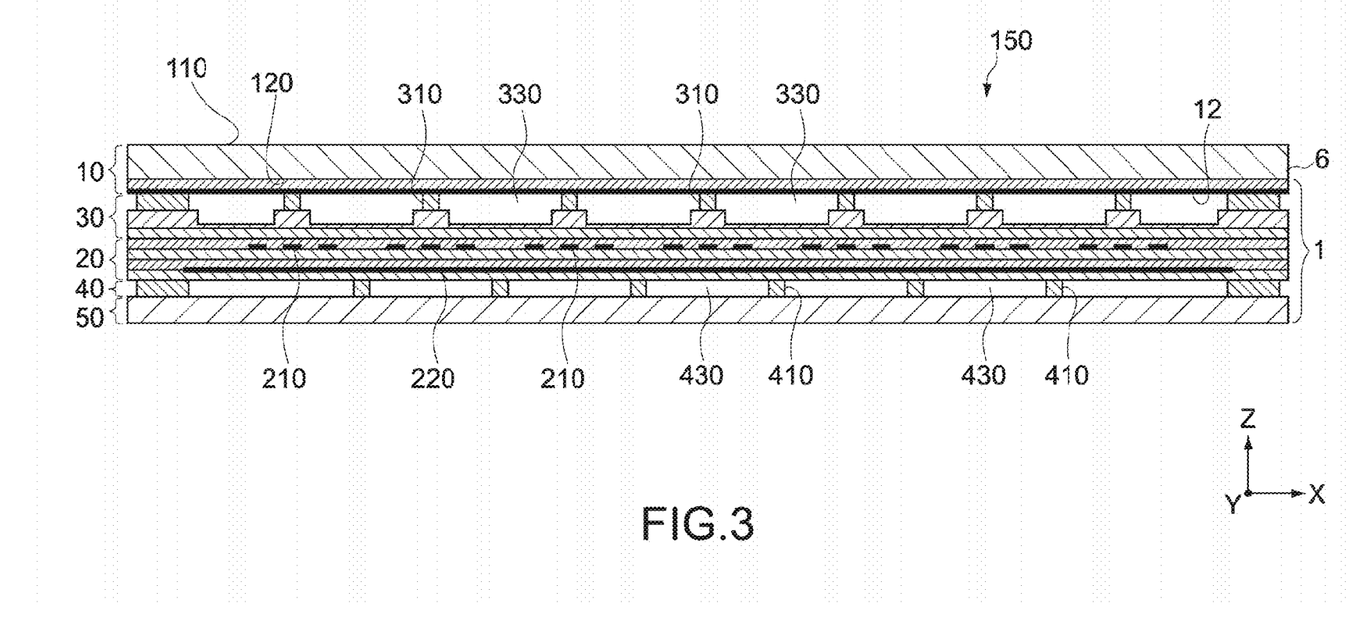
FIG. 3 A schematic cross-sectional diagram of an input apparatus included in the tablet computer.

Next, the structure of the input apparatus 150 will be described. FIG. 3 is a schematic cross-sectional diagram of the input apparatus 150. As shown in the figure, the input apparatus 150 includes the display 6 that accepts pen operations and the sensor 1 that detects user operations. The input apparatus 150 is structured as a flexible touch panel display, for example, and is incorporated into the tablet 100. The sensor 1 and the display 6 are each formed as a plate extending in a direction vertical to a Z axis.

The display 6 includes a first surface 110 and a second surface 120 on the other side of the first surface 110. The display 6 has both a function as an input operation section and a function as a display section in the input apparatus 150. Specifically, the display 6 causes the first surface 110 to function as an input operation surface and a display surface and displays an image corresponding to a user operation upwardly in the Z-axis direction from the first surface 110. Displayed on the first surface 110 are letters written by a user or an image drawn by a user using the stylus S, an image corresponding to a keyboard, a GUI (Graphical User Interface), and the like.

The specific structure of the display 6 is not limited in particular. For example, as the display 6, a so-called electronic paper, an organic EL (Electro Luminescence) panel, an inorganic EL panel, a liquid crystal panel, or the like may be used. The thickness of the display 6 is not limited in particular and is, for example, about 0.1 mm to 1 mm.

The sensor 1 includes a metal film (first conductive layer) 12, a conductive layer (second conductive layer) 50, an electrode substrate 20, a first supporting body 30, and a second supporting body 40. The sensor 1 is arranged on the second surface 120 side of the display 6.

The metal film 12 has a deformable sheet-like structure. The conductive layer 50 opposes the metal film 12. The electrode substrate 20 includes a plurality of first electrode lines 210 and a plurality of second electrode lines 220 that oppose the plurality of first electrode lines 210 and intersect the plurality of first electrode lines 210, is arranged while being deformable between the metal film 12 and the conductive layer 50, and is capable of statically detecting a distance change with respect to each of the metal film 12 and the conductive layer 50. The first supporting body 30 includes a plurality of first structures 310 that connect the metal film 12 and the electrode substrate 20 and first spatial sections 330 formed among the plurality of first structures 310. The second supporting body 40 includes a plurality of second structures 410 that are each provided between the plurality of adjacent first structures 310 and connect the conductive layer 50 and the electrode substrate 20 and second spatial sections 430 formed among the plurality of second structures 410.

The sensor 1 (input apparatus 150) of this embodiment statically detects a change of a distance between the metal film 12 and the electrode substrate 20 and a change of a distance between the conductive layer 50 and the electrode substrate 20 due to an input operation made on the first surface 110 of the display 6, to detect coordinates of a position at which the input operation is made and a weight applied to that position. A specific detection principle is as follows.

Specifically, the metal film 12 is bent by a pressing force caused at a time an input operation is made on the first surface 110 by the stylus S. Accompanying this, the first structures 310 adjacent to the first spatial sections 330 receive the force to be elastically deformed in the Z-axis direction, and the thickness slightly reduces. Furthermore, a force is also applied to the electrode substrate 20 by the force to bend it downwardly. As a result, the second structure 410 arranged between the two first structures 310 is also applied with the force so as to be elastically deformed in the Z-axis direction, and the thickness slightly reduces.

As described above, the force can be transmitted in the thickness direction by the first and second structures 310 and 410, and the electrode substrate 20 can be deformed with ease. Moreover, since the metal film 12 and the electrode substrate 20 are bent and an influence of the pressing force reaches the in-plane direction (direction parallel to X- and Y-axis directions), the force influences not only an area immediately below the stylus S but also the first and second structures 310 and 410 in the vicinity thereof.

Further, the metal film 12 and the electrode substrate 20 can be easily deformed by the first and second spatial sections 330 and 430. Furthermore, by the first and second structures 310 and 410 having a cylindrical structure or the like, a high pressure can be applied to the electrode substrate 20 with respect to the pressing force of the stylus S, and the electrode substrate 20 can therefore be bent efficiently.

In addition, since the first and second structures 310 and 410 do not overlap one another in the Z-axis direction, the first structures 310 can cause the electrode substrate 20 to be bent easily via the second spatial sections 430 below them.

The electrode substrate 20 can obtain a capacitance change amount by detecting changes in the distance between the metal film 12 and the electrode substrate 20 and the distance between the conductive layer 50 and the electrode substrate 20 due to the elastic deformation of the first structures 310 and the bending of the metal film 12.

The electrode substrate 20 can calculate XY coordinates of a pen operation position (tip end position of stylus S) based on a ratio of the capacitance change amounts at the respective positions of the plurality of first electrode lines 210 and the plurality of second electrode lines 220. The electrode substrate 20 can also calculate the weight (pressing force) at the input operation position based on the capacitance change amounts.

[Tablet Operation]

Next, operations of the tablet 100 structured as described above will be described. In this and subsequent embodiments, the operations of the tablet 100 are carried out in cooperation with the CPU 3 and software executed under control of the CPU 3.

(Data Acquisition/Calculation Processing)

Figure 4:
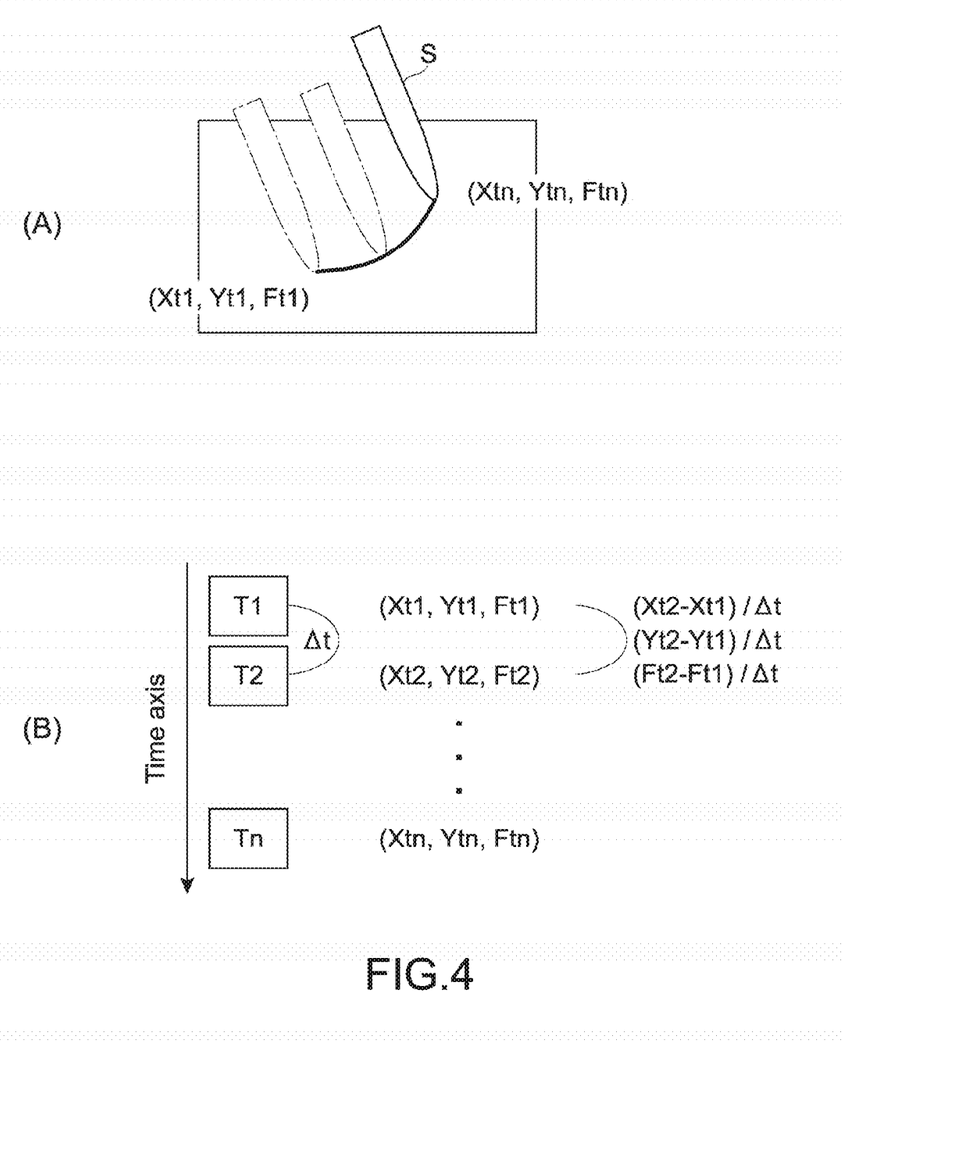
FIG. 4 Diagrams for explaining calculation processing of coordinate data, weight data, movement velocity data, and temporal weight change data by the tablet computer.

First, processing of acquiring and calculating the coordinate data, weight data, movement velocity data, and weight change data will be described. FIG. 4 are diagrams for explaining the processing of calculating the data.

FIG. 4(A) shows the processing of calculating the coordinate data and weight data. The sensor 1 outputs, while a user is performing a pen operation, coordinate data ((Xt1, Yt1), (Xt2, Yt2), . . . , (Xtn, Ytn)) and weight data (Ft1, Ft2, . . . , Ftn) at a contact position of the stylus S at predetermined time intervals, and the CPU 3 writes those data in the memory 4 as necessary.

FIG. 4(B) shows the processing of calculating the movement velocity data and weight change data. The sensor IC 2 calculates the movement velocity data from a difference in the coordinate data per unit time Δt ((Xt2−Xt1)/Δt, (Yt2−Yt1)/Δt), and calculates the weight change data from a difference in the weight data per unit time Δt ((Ft2−Ft1)/Δt). The CPU 3 also writes those data in the memory 4 as necessary.

(Individual Authentication Operation Based on Recording Data)

Figure 5:
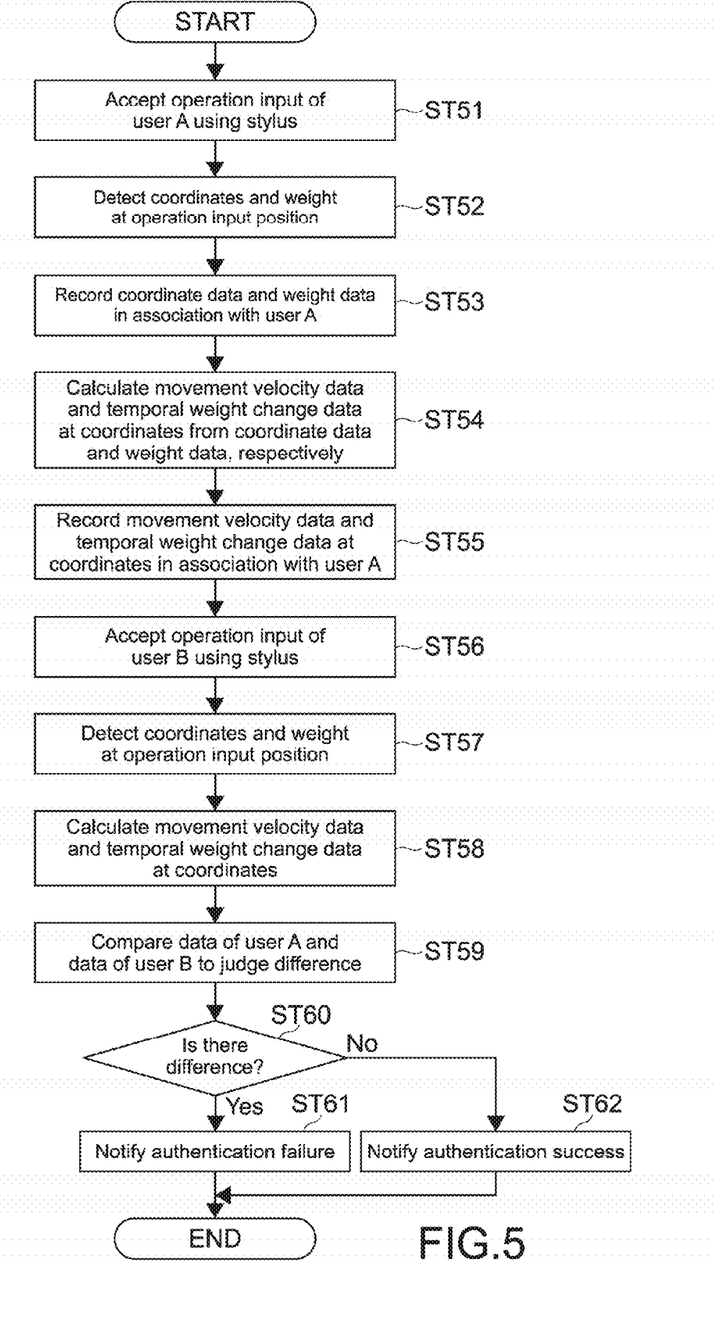
FIG. 5 A flowchart showing a flow of individual authentication processing by the tablet computer.

Next, individual authentication processing based on the recorded data will be described. FIG. 5 is a flowchart showing a flow of the individual authentication processing. In the descriptions below, the CPU 3 is described as an operation subject. However, the operation is executed in cooperation with other hardware such as the sensor 1, the sensor IC 2, and the memory 4 and related software.

As shown in the figure, the CPU 3 of the tablet 100 accepts a pen operation of a user A using the stylus S (Step 51). The pen operation is an operation for inputting a signature that is performed at a time of a credit card settlement, at a time of login to a computer or a network, and the like, for example. The signature includes any letter, figure, or the like that has been written for identifying an individual in addition to a correct name.

Subsequently, the CPU 3 detects coordinates at which the pen operation is made and a weight applied to the position (Step 52). At this time, the CPU 3 causes the display 6 to display a trajectory of the pen operation as shown in FIG. 1. However, the display processing may be omitted.

Then, the CPU 3 records the coordinate data and the weight data in the memory 4 in association with the user A as the operation subject (Step 53).

Next, the CPU 3 calculates movement velocity data and weight change data from the coordinate data and the weight data, respectively, (Step 54) and records those data in the memory 4 in association with the user A (Step 55). The processing up to this point becomes recording processing of input operation data of the user A using the stylus S.

Subsequently, the CPU 3 shifts to the authentication processing that utilizes the recorded input operation. The CPU 3 accepts a pen operation of a user B (irrespective of whether he/she is different person from user A) using the stylus S.

Then, the CPU 3 detects coordinates and a weight of the input operation position of the user B (Step 57).

After that, the CPU 3 calculates movement velocity data and weight change data at the coordinates from the coordinate data and the weight data (Step 58).

Then, the CPU 3 reads out the recorded input operation data of the user A from the memory 4, compares it with the input operation data of the user B, and judges a difference between those data (Step 59).

Then, when there is a difference as a result of the comparison (Yes in Step 60), the CPU 3 causes the display 6 to display information for notifying an authentication failure (Step 61).

On the other hand, when there is no difference or there is a minute difference (No in Step 60), the CPU 3 causes the display 6 to display information for notifying an authentication success (Step 62).

Figure 6:
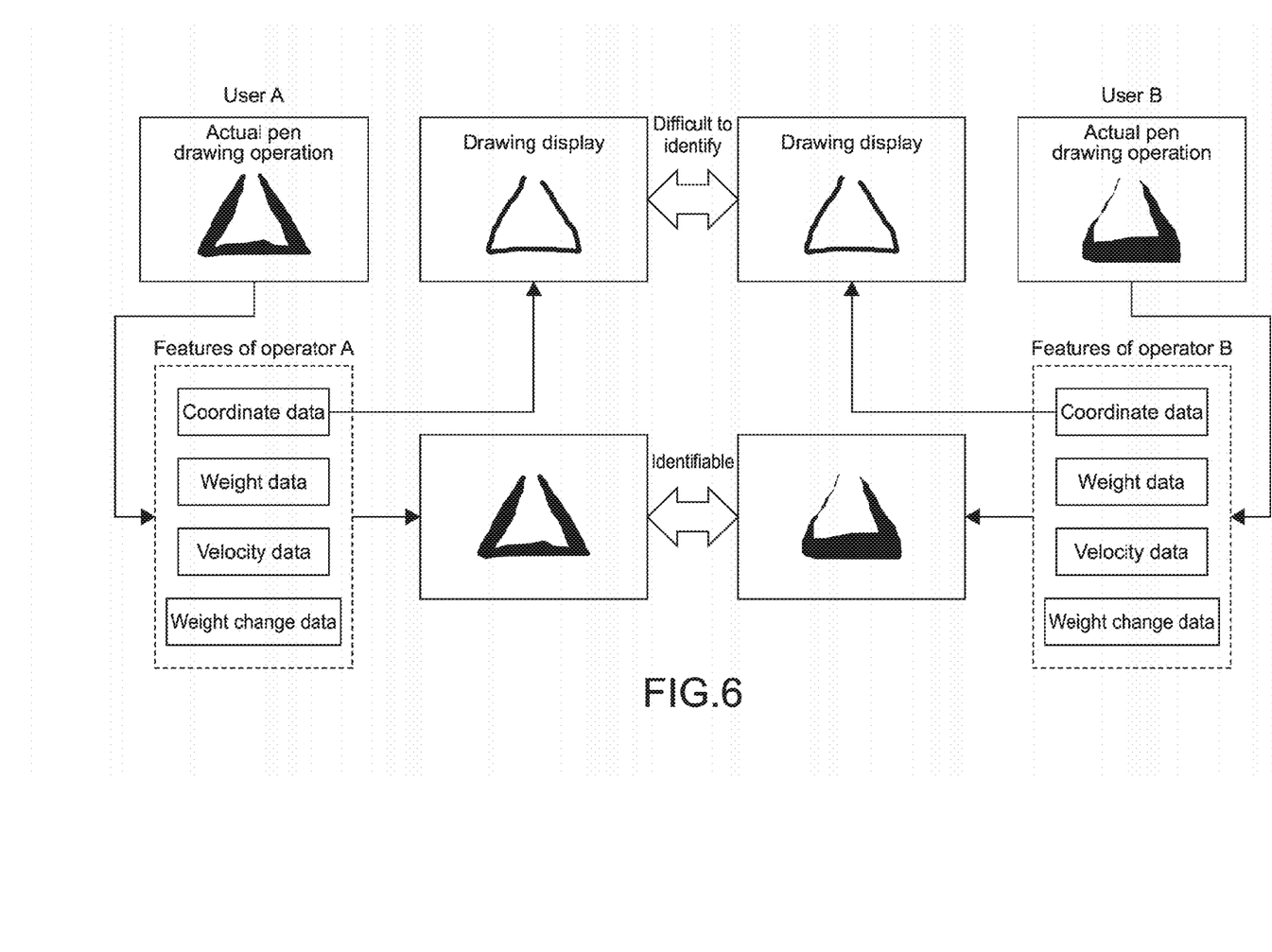
FIG. 6 A diagram for explaining examples of pen operations made by different users and processing of comparing them in the first embodiment of the present technique.

FIG. 6 is a diagram for explaining examples of the pen operations made by the users A and B and the processing of comparing them.

As shown in the figure, in a case where processing of changing a line width or the like is not carried out on a display image as a pen operation result, for example, regarding a habit of the user A in putting a force (weight) during a pen operation, the habit of the user cannot be discriminated from the display image (see upper portion of figure).

However, since the habit of the user regarding a degree of a force is recorded as weight data in the recording data of the pen operation in this embodiment, by comparing the recording data with a degree of a force of the user B, it becomes possible to raise an individual authentication rate (see lower portion of figure). On the other hand, by expressing a display image by lines of equal widths and not reflecting the degree of a force, it becomes difficult to copy the pen operation of the user A including the degree of a force even if the user B looks at the image (signature) showing the pen operation of the user A.

Figure 7:
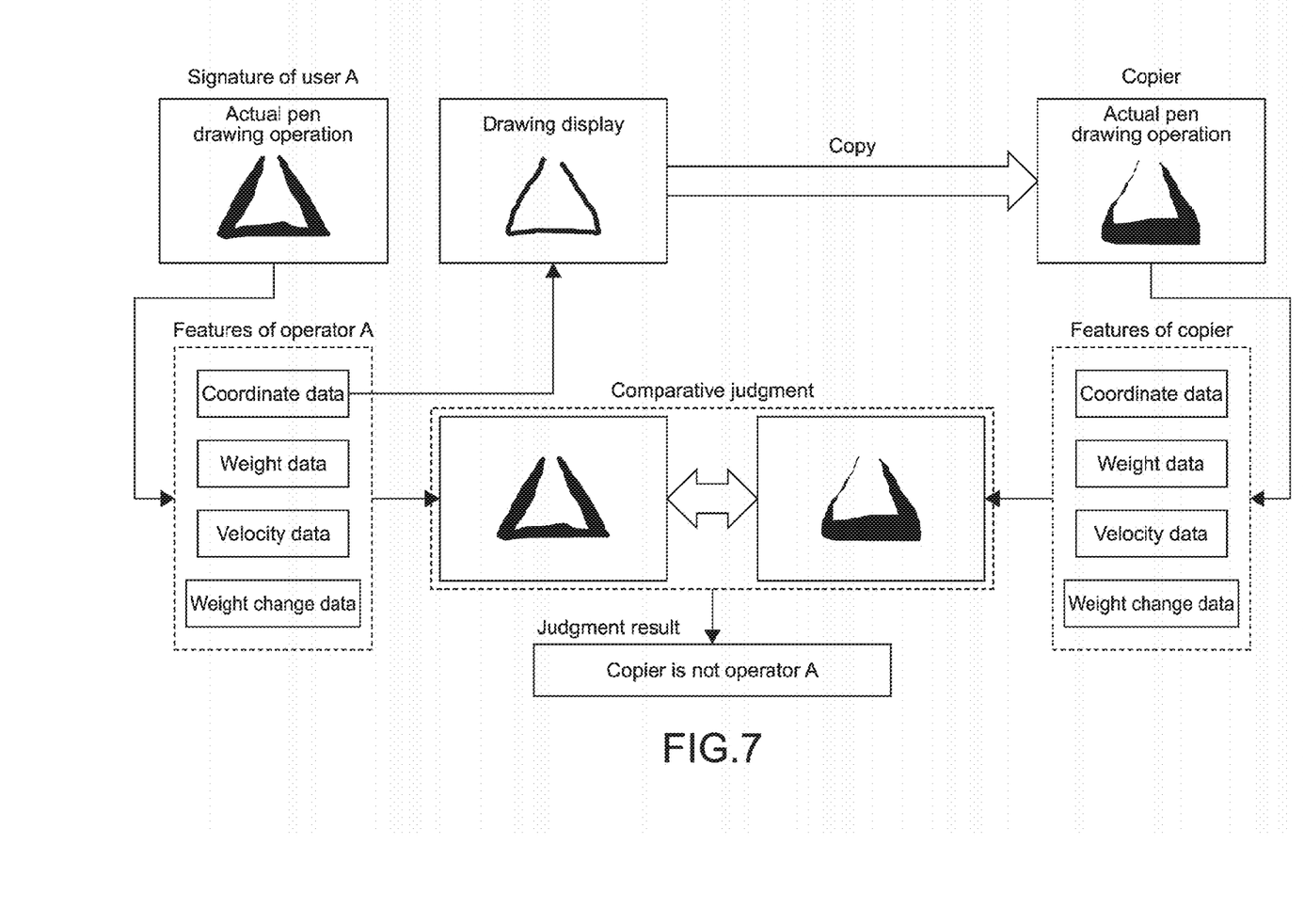
FIG. 7 A diagram for explaining processing of discriminating a copier of a pen operation of a certain user in the first embodiment of the present technique.

FIG. 7 is a diagram for explaining processing of discriminating a copier copying a pen operation of the user A.

As shown in the figure, regarding a habit of the stylus S on a movement velocity during a pen operation of the user A, since a difference in the movement velocity is not expressed in the display image as the pen operation result, the copier cannot grasp the habit of the user A from the display image. On the other hand, since the habit of the user A on the velocity is recorded as the movement velocity data in the recording data of the pen operation, by comparing the movement velocity data, it becomes possible to raise the individual authentication rate. Moreover, by not reflecting the velocity on the display image, it becomes difficult for the copier to copy the pen operation of the user A including the velocity.

As described above, in this embodiment, by recording the pen operation of the user as coordinate data, weight data, movement velocity data, and weight change data by the sensor 1 capable of detecting coordinate data and weight data, the tablet 100 can execute the individual authentication processing depending on recording contents.

Second Embodiment

Next, a second embodiment of the present technique will be described. In this embodiment, descriptions on points that are common with the first embodiment will be simplified or omitted, and different points will mainly be described.

The first embodiment has described the example where the tablet 100 executes the individual authentication processing based on recorded pen operation data. In this embodiment, the tablet 100 executes, based on recorded pen operation data, an application with which a correct handwriting or picture drawing can be learned.

While the stylus S has been used for an input operation in the first embodiment, other writing tools such as an ink brush for calligraphy and an ink brush for drawing may be used in addition to the stylus in this embodiment.

Figure 8:
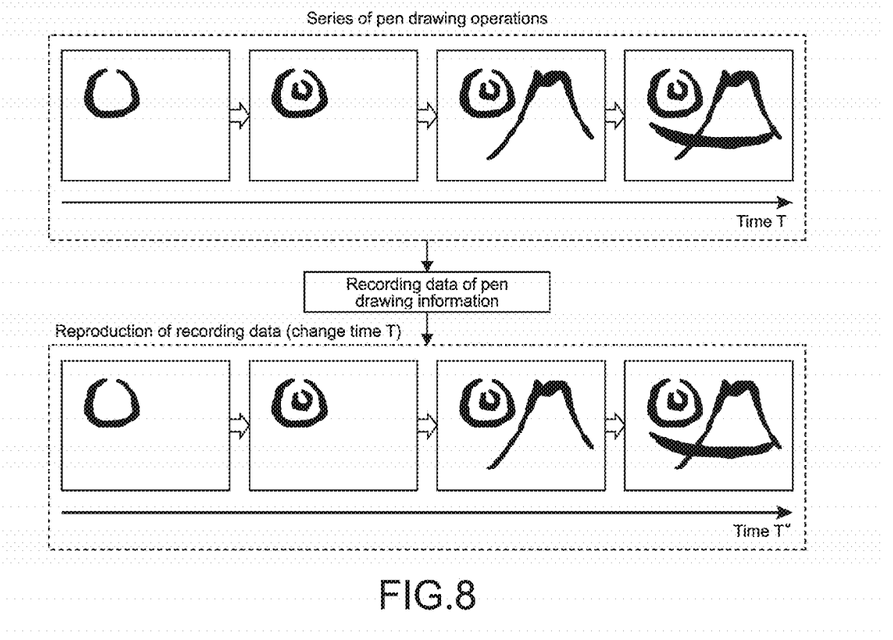
FIG. 8 A diagram showing a picture drawing operation of a certain user and reproduction processing based on recording data of the drawing operation according to a second embodiment of the present technique.

FIG. 8 is a diagram showing a picture drawing operation of a certain user and reproduction processing based on recording data of the drawing operation.

As shown in the figure, when a certain user inputs a drawing operation, a drawing result is displayed on the display 6, and coordinate data, weight data, movement velocity data, and weight change data obtained during the operation are recorded in the memory 4 (see upper portion and center portion of figure). In the processing of displaying the drawing result, a line width is changed according to the weight data.

Subsequently, a drawing operation is reproduced using the recorded drawing operation data (see lower portion of figure). The reproduction processing is fundamentally different from the reproduction processing based on recording data of the related art in the point of using the drawing operation data (re-drawing processing).

At this time, as shown in the figure, the tablet 100 may change the velocity in the reproduction processing from the velocity during the recording.

Figure 9:
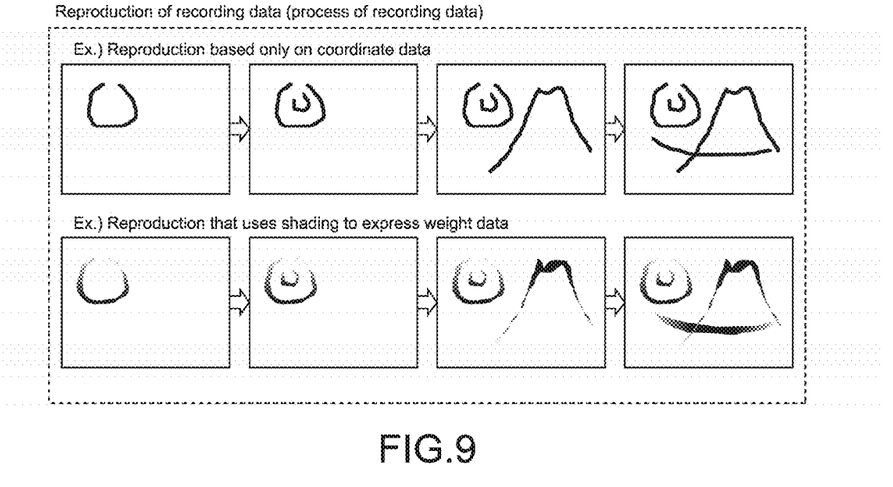
FIG. 9 A diagram showing a reproduction example of the drawing operation that uses various types of recording data in the second embodiment of the present technique.

FIG. 9 is a diagram showing another example of the reproduction processing that uses the drawing operation data.

As shown in the upper portion of the figure, the tablet 100 may reproduce a drawing operation using only coordinate data out of the drawing operation data. Alternatively, as shown in the lower portion of the figure, the tablet 100 may reproduce the drawing operation while expressing weight data as shading in addition to the coordinate data.

Alternatively, the tablet 100 may change the line width or color used in the drawing or sequentially reproduce a plurality of pieces of recording data.

An apparatus used when recording the drawing operation (tablet) and an apparatus used for the reproduction (tablet) may be different apparatuses. In other words, drawing operation data recorded in a certain apparatus may be transmitted to and reproduced in another apparatus.

Typically, a solution of recording drawing data of a prominent artist, calligrapher, and the like in advance, and storing the data in the tablet 100 via a server on the Internet or in a preinstall form, for example, so that a user learns painting or calligraphy based on the drawing data is conceivable.

Further, a solution in which a user records a letter or picture written/drawn by him/herself in the tablet 100 as drawing history data so as to review it for learning later on is also possible.

Furthermore, in this embodiment, a learning (education) application that records in real time, while a drawing operation of the user A is being reproduced using recording data, a drawing operation obtained as a result of the other user B copying the drawing operation of the user A, and compares the recording data of the user A and the recording data of the user B is also executable.

Figure 10:
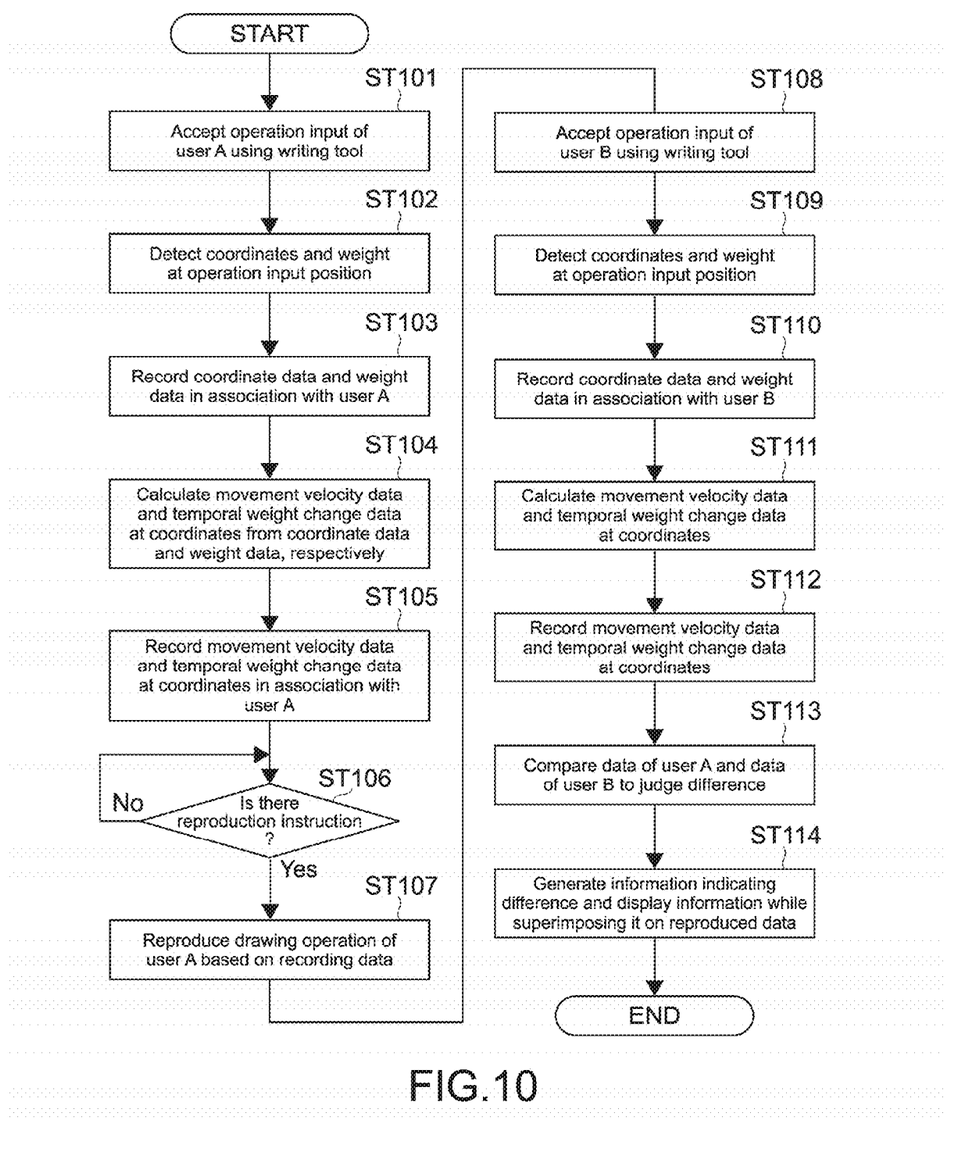
FIG. 10 A diagram showing a flow of operations of the tablet computer at a time of executing a picture or calligraphy learning application in the second embodiment of the present technique.
Figure 11:
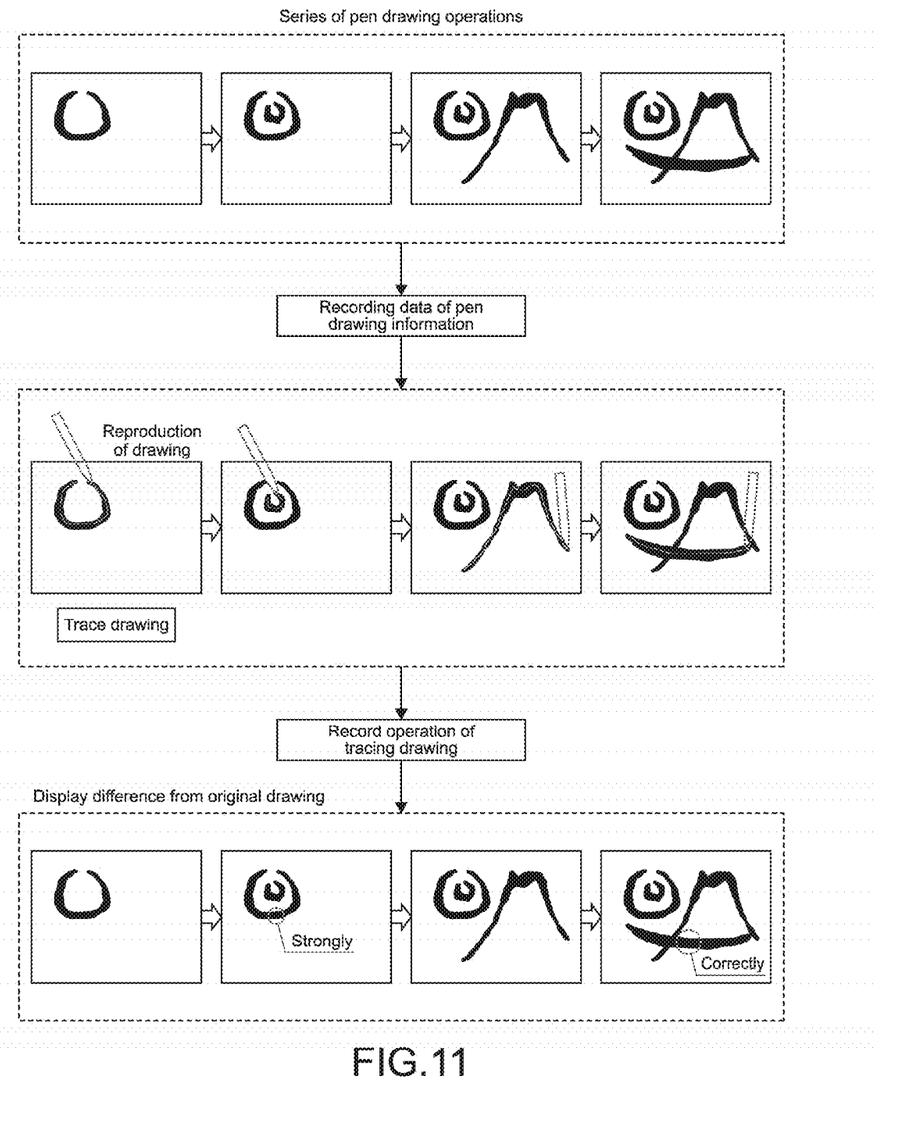
FIG. 11 A diagram showing a flow of processing of the picture or calligraphy learning application.

FIG. 10 is a diagram showing a flow of operations of the tablet computer at a time of executing the learning application. Further, FIG. 11 is a diagram showing a flow of processing of the learning application.

As shown in FIG. 10, the CPU 3 of the tablet 100 first accepts a drawing operation input of the user A (Step 101).

Next, the CPU 3 detects coordinates of an input position of the drawing operation and a weight applied to the input position (Step 102) and records the coordinate data and the weight data in association with the user A (Step 103). At this time, an image showing a trajectory from a start to an end of the drawing operation of the user A is displayed on the display 6 (see upper portion of FIG. 11).

Subsequently, the CPU 3 calculates the movement velocity data and the weight change data from the coordinate data and the weight data, respectively, (Step 104) and records the data in the memory 4 in association with the user A (Step 105).

Then, the CPU 3 judges whether a reproduction instruction has been given regarding a drawing operation of the user A (Step 106).

When the reproduction instruction has been given (Yes), the CPU 3 reproduces the drawing operation of the user A on the display 6 based on the recording data (Step 107). At the same time, the CPU 3 accepts a drawing operation of the user B in which the user B traces the drawing operation of the user A that has been reproduced or that is being reproduced (Step 108) (see center portion of FIG. 11).

Subsequently, the CPU 3 detects coordinates and a weight regarding the drawing operation of the user B (Step 109) and records coordinate data and weight data in the memory 4 in association with the user B (Step 110).

Then, the CPU 3 calculates movement velocity data and weight change data from the coordinate data and the weight data, respectively, (Step 111) and records the data in the memory 4 in association with the user B (Step 112).

Subsequently, the CPU 3 compares the drawing operation data of the user A and the drawing operation data of the user B that have been recorded and judges a difference between them (Step 113).

Then, the CPU 3 generates information indicating the difference and displays the information on the display 6 while superimposing it on the reproduced drawing operation data of the user A (Step 114).

For example, when the weight data of the user B is smaller than the weight data of the user A at a certain position as shown in the lower portion of FIG. 11, that is, a force of the user B is insufficient, a message "strongly" may be displayed while pointing that position. Moreover, when there is a deviation between the coordinate data of the user A and the coordinate data of the user B, a message "correctly" may be displayed while pointing that position. In addition, when a drawing velocity of the user B is slow or there is unevenness in the weight, for example, a message indicating the fact may be displayed.

As described above, according to this embodiment, the tablet 100 can notify the user B of a difference between the drawing operation of the user A and the drawing operation of the user B. As a result, the user B can grasp differences in brushworks, forces in using an ink brush, and the like in ink brush drawing, for example. In other words, the user B can practice to attain the drawing performance of the user A as an example. Such an application may be used by individual users or in educational institutions such as schools.

Modified Example

The present technique is not limited to the embodiments above and may be variously modified without departing from the gist of the present technique.

Although the sensor 1 detects only an input operation using the writing tool in the embodiments above, the sensor 1 is of course also capable of detecting an operation using a finger of a user and the like, for example. The sensor 1 is also capable of detecting coordinates and a weight of a hand of a user that touches the first surface 110 of the display 6 at a time an input operation is made using a writing tool. Accordingly, by also recording the way a hand of a user is placed during a pen operation as a feature of the user, for example, the tablet 100 can raise the authentication rate in the individual authentication processing and provide a more specific example in the learning application.

The embodiments above have described the examples of utilizing recording data obtained during an input operation in the authentication processing and the learning application, but the recording data can also be utilized in various other solutions.

For example, if coordinate data and weight data on a keyboard or a drum are recorded when a certain user plays a piano or a drum, those data can be utilized in a performance learning application.

Further, by also recording drawing operation data when an artist such as a painter newly produces an art work, when a fake of that art work appears later on, the fake can be detected by comparing drawing operation data of that fake if the drawing operation data thereof exists.

Although the drawing operation data has been used in the learning application in the second embodiment above, it is also possible to create values in the drawing operation data itself. For example, drawing data of an artist may be downloaded via the Internet or the like based on a user request. Accordingly, since the data is not only data as a drawing result but also data including subtle brushworks and the like of the artist, various applications are possible, and a high value as a product can be imparted.

Although the movement velocity data and weight change data have been used in various types of processing in addition to the coordinate data and weight data in the embodiments above, at least one of the coordinate data, weight data, movement velocity data, and weight change data may be used selectively for the authentication processing and reproduction processing as necessary.

The embodiments above have described the example where the present technique is applied to a tablet computer. However, the present technique is also applicable to various information processing apparatuses onto which a touch sensor can be mounted, such as a laptop PC, a smartphone, a PDA (Personal Digital Assistant), an electronic book reader, a portable player, and a car navigation system.

[Others]

The present technique may also take the following structures.

(1) An information processing apparatus, including:

a sensor that includes an input surface for accepting an input operation of a user using a writing tool and is capable of detecting coordinates of a position at which the input operation is made and a weight applied to the position;

a storage section; and a controller capable of causing the storage section to store, at predetermined time intervals, coordinate data indicating the detected coordinates and weight data indicating the weight in association with identification information of the user, and reading out the stored coordinate data and weight data from the storage section in association with the identification information.

(2) The information processing apparatus according to (1) above, in which the controller is capable of calculating movement velocity data indicating a movement velocity of the coordinates from the coordinate data stored at the predetermined time intervals.

(3) The information processing apparatus according to (1) or (2) above, in which the controller is capable of calculating weight change data indicating a temporal change of the weight from the weight data stored at the predetermined time intervals.

(4) The information processing apparatus according to any one of (1) to (3) above, in which the controller is capable of comparing the coordinates and the weight detected from an input operation made using the writing tool after the coordinate data and the weight data are stored, with the stored coordinate data and weight data and judging whether there is a difference.

(5) The information processing apparatus according to (4) above, in which the controller is capable of authenticating the user based on the judgment on whether there is a difference and outputting an authentication result.

(6) The information processing apparatus according to (5) above, further including a display section, in which the controller is capable of controlling the display section to display, based on the input operation, an image showing a trajectory from a start to an end of the input operation using only the coordinate data out of the coordinate data and the weight data.

(7) The information processing apparatus according to any one of (1) to (6) above, further including an output section, in which the controller is capable of controlling the output section to output information indicating the judged difference.

(8) The information processing apparatus according to any one of (1) to (7) above, further including a display section, in which the controller is capable of controlling the display section to display, based on the stored coordinate data and weight data, a first image that shows a trajectory from a start to an end of the input operation of the user.

(9) The information processing apparatus according to (8) above, in which the sensor is capable of detecting, after the display of the image, coordinate data and weight data from an input operation made by another user using the writing tool, and in which the controller is capable of controlling the display section to display, based on the detected coordinate data and weight data, a second image that shows a trajectory from a start to an end of the input operation of the another user while superimposing the second image on the first image, comparing the stored coordinate data and weight data with the coordinate data and the weight data detected from the input operation of the another user, and controlling the display section to display information indicating a difference between the first image and the second image.

(10) The information processing apparatus according to (9) above, in which the controller changes a line width or shading of the first image and the second image according to the stored weight data and the weight data detected from the input operation of the another user.

(11) The information processing apparatus according to any one of (1) to (10) above, in which the sensor is capable of detecting, when a hand of the user touches the input surface at a time the user makes the input operation using the writing tool, coordinates of the contact position and a weight applied to the contact position, and in which the controller causes the storage section to store coordinate data indicating the detected coordinates of the contact position and weight data indicating the weight applied to the contact position in association with the coordinate data and the weight data, that have been detected from the input operation, and the identification information.

(12) The information processing apparatus according to any one of (1) to (11) above, further including a communication section, in which the controller controls the communication section to transmit the stored coordinate data and weight data to another information processing apparatus, and in which the another information processing apparatus displays an image that shows a trajectory from a start to an end of the input operation of the user based on the transmitted coordinate data and weight data.

DESCRIPTION OF REFERENCE NUMERALS 1 sensor
2 sensor IC
3 CPU
4 memory
5 graphic driver
6 display
100 tablet computer
110 first surface
150 input apparatus

The invention claimed is:

1. An information processing apparatus, comprising:
a sensor that includes an input surface for accepting an input operation of a user using a writing tool and is capable of detecting:
first coordinates of a first contact position at which the input operation is made and a first weight applied to the first contact position; and
second coordinates of a second contact position where a hand of the user touches the input surface at a time the user makes the input operation using the writing tool, and a second weight applied to the second contact position;
a storage section; and
a controller capable of:
causing the storage section to store, at selected time intervals:
first coordinate data indicating the detected first coordinates and first weight data indicating the first weight, wherein the first coordinate data and the first weight data are stored in association with identification information of the user; and
second coordinate data indicating the detected second coordinates and second weight data indicating the second weight, wherein the second coordinate data and the second weight data are stored in association with the first coordinate data, the first weight data, and the identification information; and
reading out the stored first coordinate data and first weight data from the storage section in association with the identification information.

2. The information processing apparatus according to claim 1, wherein the controller is capable of calculating movement velocity data indicating a movement velocity of the first coordinates from the first coordinate data stored at the selected time intervals.

3. The information processing apparatus according to claim 1, wherein the controller is capable of calculating weight change data indicating a temporal change of the first weight from the first weight data stored at the selected time intervals.

4. The information processing apparatus according to claim 1, wherein the input operation comprises a first input operation, and wherein the controller is capable of comparing third coordinates and a third weight detected from a second input operation made using the writing tool after the first coordinate data and the first weight data are stored, with the stored first coordinate data and first weight data and judging whether there is a difference.

5. The information processing apparatus according to claim 4, wherein the controller is capable of authenticating the user based on the judgment on whether there is a difference and outputting an authentication result.

6. The information processing apparatus according to claim 5, further comprising a display section, wherein the controller is capable of controlling the display section to display, based on the input operation, an image showing a trajectory from a start to an end of the input operation using only the first coordinate data out of the first coordinate data and the first weight data.

7. The information processing apparatus according to claim 4, further comprising an output section, wherein the controller is capable of controlling the output section to output information indicating the judged difference.

8. The information processing apparatus according to claim 1, further comprising a display section, wherein the controller is capable of controlling the display section to display, based on the stored first coordinate data and first weight data, a first image that shows a trajectory from a start to an end of the input operation of the user.

9. The information processing apparatus according to claim 8,
wherein the input operation comprises a first input operation, wherein the image comprises a first image,
wherein the sensor is capable of detecting, after the display of the first image, third coordinate data and third weight data from a second input operation made by a second user using the writing tool, and wherein the controller is capable of:
 controlling the display section to display, based on the detected third coordinate data and the third weight data, a second image that shows a trajectory from a start to an end of the second input operation of the second user while superimposing the second image on the first image;
 comparing the stored first coordinate data and first weight data with the third coordinate data and the third weight data detected from the second input operation of the second user; and
 controlling the display section to display information indicating a difference between the first image and the second image.

10. The information processing apparatus according to claim 9, wherein the controller changes a line width or shading of the first image and the second image according to the stored third weight data and the third weight data detected from the second input operation of the second user.

11. The information processing apparatus according to claim 1, further comprising:
 a communication section;
 wherein the controller controls the communication section to transmit the stored first coordinate data and first weight data to another information processing apparatus; and
 wherein the another information processing apparatus displays an image that shows a trajectory from a start to an end of the input operation of the user based on the transmitted first coordinate data and first weight data.

12. An information processing method, comprising:
 detecting, by a sensor including an input surface for accepting an input operation of a user using a writing tool, first coordinates of a first contact position at which the input operation is made and a first weight applied to the first contact position;
 detecting, by the sensor, second coordinates of a second contact position where a hand of the user touches the input surface at a time the user makes the input operation using the writing tool, and a second weight applied to the second contact position;
 storing, by a storage section, at selected time intervals:
  first coordinate data indicating the detected first coordinates and first weight data indicating the first weight, wherein the first coordinate data and the first weight data are stored in association with identification information of the user; and
  second coordinate data indicating the detected second coordinates and second weight data indicating the second weight, wherein the second coordinate data and the second weight data are stored in association with the first coordinate data, the first weight data, and the identification information; and
 reading out the stored first coordinate data and first weight data from the storage section in association with the identification information.

13. A computer-readable storage medium having stored thereon instructions that, when executed by at least one processor, perform a method for information processing, the method comprising:
 detecting, by a sensor including an input surface for accepting an input operation of a user using a writing tool, first coordinates of a first contact position at which the input operation is made and a first weight applied to the first contact position;
 detecting, by the sensor, second coordinates of a second contact position where a hand of the user touches the input surface at a time the user makes the input operation using the writing tool, and a second weight applied to the second contact position;
 storing, by a storage section, at selected time intervals:
  first coordinate data indicating the detected first coordinates and first weight data indicating the first weight, wherein the first coordinate data and the first weight data are stored in association with identification information of the user; and
  second coordinate data indicating the detected second coordinates and second weight data indicating the second weight, wherein the second coordinate data and the second weight data are stored in association with the first coordinate data, the first weight data, and the identification information; and
 reading out the stored first coordinate data and first weight data from the storage section in association with the identification information.

14. The information processing method of claim 12, further comprising:
 calculating movement velocity data indicating a movement velocity of the first coordinates from the first coordinate data stored at the selected time intervals.

15. The information processing method of claim 12, further comprising:
 calculating weight change data indicating a temporal change of the first weight from the first weight data stored at the selected time intervals.

16. The information processing method of claim 12, wherein the input operation comprises a first input operation, and wherein the method further comprises:
 comparing third coordinates and a third weight detected from a second input operation made using the writing tool after the first coordinate data and the first weight data are stored, with the stored first coordinate data and first weight data and judging whether there is a difference.

17. The computer-readable storage medium of claim 13, wherein the method further comprises:
 calculating movement velocity data indicating a movement velocity of the first coordinates from the first coordinate data stored at the selected time intervals.

18. The computer-readable storage medium of claim 13, wherein the method further comprises:
 calculating weight change data indicating a temporal change of the first weight from the first weight data stored at the selected time intervals.

19. The computer-readable storage medium of claim 13, wherein the input operation comprises a first input operation, and wherein the method further comprises:
 comparing third coordinates and a third weight detected from a second input operation made using the writing tool after the first coordinate data and the first weight data are stored, with the stored first coordinate data and first weight data and judging whether there is a difference.

* * * * *